Patented Nov. 29, 1932

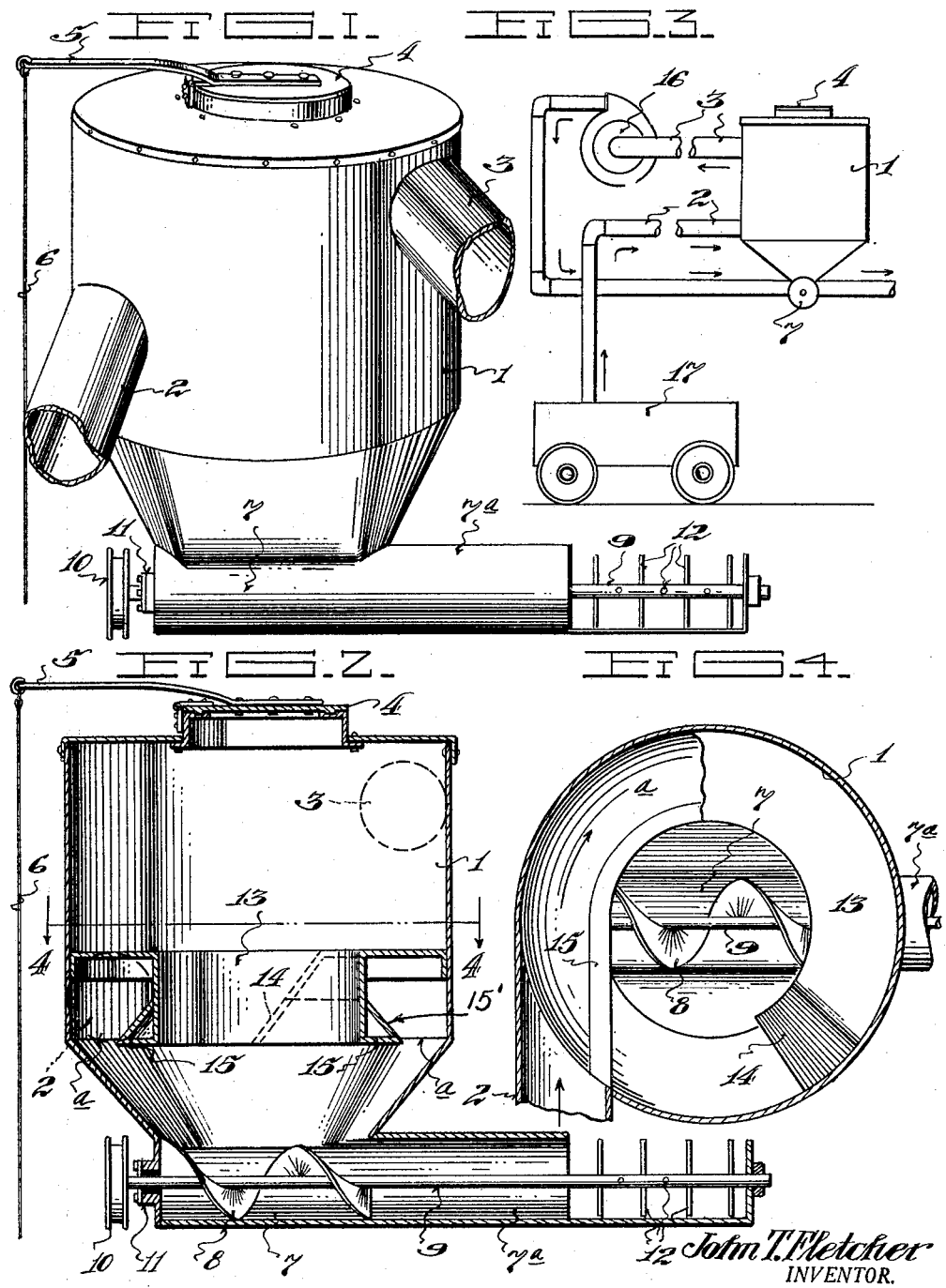

1,889,176

UNITED STATES PATENT OFFICE

JOHN T. FLETCHER, OF PLAINVIEW, TEXAS

COMMODITY HANDLING APPARATUS

Application filed November 21, 1929. Serial No. 408,772.

This invention relates to commodity handling apparatus and it has particular reference to an apparatus for moving grain and other material such as wheat, barley, oats, kaffir corn, maize, cotton and the like, the principal object being to provide in an apparatus of the character specified, several combined forces to effect the separation of air from the commodity, through which arrangement the air blast, created by a conventional blower, may be circulated to either discharge to atmosphere after having served the purpose of transferring material to a desired location, or to be again applied to convey the material to other locations in a mill or gin, as the case may be, after having been employed to unload cars, wagons or other carriers.

Another object of the invention resides in the provision of an apparatus by which commodities may be moved in such a manner as to prevent the necessity of their being drawn through the blower, which would obviously subject the material to a severe beating and thereby injure the same, and in the case of grain such as wheat, barley or maize, such action would not only be detrimental to the grain, but would likewise act to clog the blower and render it useless in a very short time. Therefore, the present invention obviates the disadvantage by introducing the material into a receptacle, wherein is provided certain novel devices for the separation of the air from the material whereby the latter may be carried off mechanically while the relatively clean air may be employed for other purposes.

With these objects as paramount, the invention has reference to certain other minor objects, as well as to the salient features of construction and arrangement of parts to become manifest as the description proceeds, taken in connection with the accompanying drawing, wherein:—

Figure 1 is a perspective view of an apparatus constructed according to the present invention.

Figure 2 is a vertical sectional view.

Figure 3 is a reduced diagrammatic view of an arrangement of conduits, in connection with the invention, showing its preferred use in bypassing the blower in unloading operations, and Figure 4 is a sectional view on lines 4—4 of Figure 2.

In continuing more in detail with the invention, it is pointed out that in the handling of shatterable grain of the character heretofore named, it is desirable to use air in preference to mechanical conveyors, for moving the material from place to place, especially in the loading and unloading operations.

It has been a heretofore difficult problem to divert the material from the air source, which latter is usually a blower, and unless this is done, the fan will shatter the grain and great quantities thereof are lost. Moreover, it becomes necessary in methods where air is employed, to ultimately separate the material from the air, whereby the former may be conveyed to a thresher or other locations, and while this may possibly be accomplished mechanically, it is the intent of the invention to employ for the purpose, the combined forces of centrifugal action, gravity and air, without the aid of any mechanically operated means in the actual separation.

Accordingly, 1 designates a hopper-like receptacle communicating with which are conduits 2 and 3 which are respectively, inlet and outlet openings to the receptacle. The receptacle has a trap door 4 in its top, to which is attached a lever arm 5, having connected therewith a line 6, by which the door 4 may be opened at will by the operator, for a purpose to be presently made clear.

Connected with the bottom of the receptacle is a tubular housing 7 in which is contained a conventional auger conveyor 8 on a shaft 9. This conveyor is of such length as to urge material into an enclosed portion 7a of the housing 7, which material, in being gradually pushed to the outlet end of this enclosed portion forms a seal whereby to prevent any dissipation of air currents passed through the receptacle in order that a uniform feed of material into the conveyor 8 may be maintained.

At one end of the shaft 9 is a drive pulley 10, and a stuffing box 11 is provided at the closed end of the conveyor housing 7, through which the shaft 9 passes. At the opposite end of the shaft are provided beater arms 12 for throwing the material into a chute (not shown) provided such is employed, for conveying the material into a threshing unit, or to any desired location. It will be presently shown, how the air blast or suction is directed for supplanting the chute mentioned for disposing of the material after the same has been unloaded from the conveyance.

Within the receptacle 1 is an annular conduit 13 which extends substantially 270° around the inner wall of the receptacle and communicates at one end, as apparent in Figure 4 with the inlet conduit 2. This conduit is of a peculiar design, being open at the bottom, as designated at a, its terminal being provided with a deflector 14 disposed at an angle with respect to the circular axis of the conduit. Adjacent the inner inside edge of the conduit is an annular deflecting surface 15, having a downwardly inclined portion 15′ whose purpose will be mentioned in the course of the description of operation.

In operation, the blower 16, shown only in Figure 3 creates a suction within the receptacle 1, through conduit 3, and since the openings in the receptacle, with the exception of conduit 2 are sealed, the suction is extended through this conduit to pick up grain or other commodity from a conveyance such as a wagon 17, or a railway car. The material is thus drawn with great velocity into the receptacle, first entering the open conduit 13, and the centrifugal force thereby established causes the material to adhere to the wall of the receptacle as it travels through the conduit 13. Thus the tendency of the material is continuously outward and downward, giving the air current suitable space in which to travel, separate from the material, and seek the opening whereat the conduit 3 communicates with the receptacle 1.

As the material is speedily drawn around the conduit 13, it is allowed to drop out of the influence of the suction created by the blower, by reason of the opening in the bottom of the conduit, assisted by the inclined deflecting surface 15′, and the further fact that after having escaped from the principal air current it is improbable that the material, other than dust accumulations, will be again suspended and carried off with the air currents. Especially is this the case in view of the converging effect of the lower portion of the receptacle at the point where it communicates with the conveyor 8.

As the material is carried rapidly around the conduit 13, some of it fails to drop through the opening a and is carried the full extent thereof. In order to prevent the air current from again suspending the material thus passing through the conduit, the angular deflecting plate 14 is provided to deflect the same downward and out of the influence of the air, whence it falls by gravity into the conveyor housing 7, to be urged by the conveyor 8 into the portion 7a to prevent the ingress of stray air at this point.

In Figure 3 it will be noted that the suction conduit 3 is continued from the discharge port of the blower 16 to the discharge opening of the conveyor housing 7. In so arranging the conduit, the beater arms 12 may be dispensed with, the material entering the conduit instead of the chute suggested in the foregoing, whence it may be carried to the desired points with the same air currents employed for primarily moving the material.

Obviously, the invention described is capable of many uses in handling of divers kinds of commodities having the characteristics of those named, and especially those which would be injured if passed through a blower, and it is of further import that the continuous suction established by the blower may be applied as an air blast to resume control of the material and convey it to desired locations.

It will be understood that it is not desired that the invention shall be limited to the specific details of construction and purpose herein set forth and that minor changes and modifications may be made therein as benefits the principle disclosed without departing from the spirit or intent of the invention as herein claimed.

What is claimed is:—

1. A separator comprising a cylindrical shell having an open frusto-conical base portion and having an air exhaust port adjacent its upper end; a curved mixture guide of inverted L-shaped cross section having its horizontal leg secured to the inner side of said shell whereby said guide forms an inverted U-shaped channel in conjunction with the wall of said shell; a downwardly inclined deflector secured to the depending member of the L adjacent its free end to partially close the opening of the U, a second deflector carried by the horizontal leg of the L at its opposite end and extending downwardly therefrom, means to introduce a heterogeneous mixture directly into one end of the guide, and means to transport the separated material from the opening of the base.

2. A separator comprising a shell having an outlet and having an air exhaust port adjacent its upper end; a hollow curved mixture guide extending about the inner periphery of said shell for substantially 270° said guide having a closed top and closed sides and an open bottom; a downwardly inclined deflecting member carried by the top of said guide at its exhaust end; means to introduce a heterogeneous mixture directly into the opposite end of the guide and means to transport the heavier separated material from the base of the shell.

3. A separator comprising a shell having an outlet and having an air exhaust port adjacent its upper end; a hollow curved mixture guide extending about the inner periphery of said shell said guide having an open end, an inclined closed end and an opening in its bottom; a downwardly inclined deflecting member carried by said guide intermediate the top and bottom of the latter, means to introduce a heterogeneous mixture directly into one end of said guide and means to transport the heavier separated material from the outlet of said shell.

4. A separator comprising a shell having an outlet and having an exhaust port adjacent its upper end, a hollow curved mixture guide extending about the inner periphery of said shell having a closed top and an inclined closed end, said guide having its lower edge extending outwardly at right angles thereto and terminating spaced from the wall of said shell, a deflecting member carried by the outwardly extending free edge portion of said guide and having its upper edge abutting the inner wall of the guide member intermediate the top and bottom of the latter, means to introduce a heterogeneous mixture directly into one end of said guide and means to transport the heavier separated material from the outlet of said shell.

5. A separator comprising a shell having an outlet exhaust port adjacent its upper end, a hollow curved mixture guide extending about the inner periphery of said shell and having a closed top and an inclined closed end, said guide having its lower edge portion extending outwardly at right angles thereto and inclined upwardly against the inner wall of said guide, said deflecting member being spaced from said shell, means to introduce a heterogeneous mixture directly into one end of said guide and means to transport the heavier separated material from the outlet of said shell.

6. A separator comprising a shell having an outlet and having an air exhaust port adjacent its upper end, a hollow curved mixture guide extending about the inner periphery of said shell having a top, side walls, a closed end, and an open bottom, a downwardly inclined deflecting member carried by one of the side walls and disposed between the top and bottom of said guide, means to introduce a heterogeneous mixture directly into one end of said guide and means to transport the heavier separated material from the outlet of said shell.

In testimony whereof I affix my signature.

JOHN T. FLETCHER.